(12) United States Patent
Metzger et al.

(10) Patent No.: US 9,670,963 B2
(45) Date of Patent: Jun. 6, 2017

(54) CONSTANT VELOCITY JOINT

(71) Applicant: DANA AUTOMOTIVE SYSTEMS GROUP, LLC, Maumee, OH (US)

(72) Inventors: Seth A. Metzger, Monclova, OH (US); Seung Tark Oh, Ann Arbor, MI (US); Jeffrey A. Dutkiewicz, Toledo, OH (US); Andrew Charles Shupe, Waterville, OH (US); Joseph H. Bradfield, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/392,410

(22) PCT Filed: Dec. 16, 2014

(86) PCT No.: PCT/US2014/070499
§ 371 (c)(1),
(2) Date: Jun. 9, 2016

(87) PCT Pub. No.: WO2015/095130
PCT Pub. Date: Jun. 25, 2015

(65) Prior Publication Data
US 2016/0290409 A1  Oct. 6, 2016

Related U.S. Application Data

(60) Provisional application No. 61/916,902, filed on Dec. 17, 2013.

(51) Int. Cl.
*B25G 3/28* (2006.01)
*F16D 1/108* (2006.01)
(Continued)

(52) U.S. Cl.
CPC .............. *F16D 1/108* (2013.01); *F16D 1/116* (2013.01); *F16D 3/223* (2013.01); *F16D 3/845* (2013.01); *F16C 3/03* (2013.01); *F16D 2001/103* (2013.01); *F16D 2003/22323* (2013.01); *Y10S 464/906* (2013.01); *Y10T 403/7033* (2015.01); *Y10T 403/7035* (2015.01)

(58) Field of Classification Search
CPC .......... F16D 1/108; F16D 1/116; F16D 3/223; F16D 3/845; F16D 2001/103; F16D 2003/22323; F16C 3/03; Y10S 464/906; Y10T 403/7033; Y10T 403/7035
USPC .................. 403/359.6; 464/15, 17, 145, 182
See application file for complete search history.

(56) References Cited

U.S. PATENT DOCUMENTS 2,844,013 A * 7/1958 Spence ..................... F16D 1/06
403/124
4,319,467 A   3/1982 Hegler et al.
(Continued)

OTHER PUBLICATIONS

European Patent Office, The International Search Report and Written Opinion issued in PCT/US2014/070499, Aug. 20, 2015, 9 pages, European Patent Office, Rijswijk, Netherlands.

*Primary Examiner* — Gregory Binda
*Assistant Examiner* — Nahid Amiri
(74) *Attorney, Agent, or Firm* — Marshall & Melhorn, LLC

(57) ABSTRACT

A constant velocity joint has an inner race and a sleeve. The sleeve connects with the inner race. In addition, the sleeve connects with a pinion shaft via splines. A nut attaches to the sleeve and also the shaft. The nut/shaft attachment is through threads.

11 Claims, 2 Drawing Sheets

(51) Int. Cl.
*F16D 1/116* (2006.01)
*F16D 3/223* (2011.01)
*F16D 3/84* (2006.01)
*F16C 3/03* (2006.01)
*F16D 1/10* (2006.01)

(56) References Cited

U.S. PATENT DOCUMENTS

| | | | |
|---|---|---|---|
| 4,369,979 A | 1/1983 | Krude et al. | |
| 4,392,838 A * | 7/1983 | Welschof | F16D 3/227 |
| | | | 464/175 |
| 4,395,247 A | 7/1983 | Roberts | |
| 4,403,781 A | 9/1983 | Riemscheid | |
| 4,411,549 A | 10/1983 | Sheppard | |
| 4,437,782 A | 3/1984 | Geisthoff | |
| 4,540,385 A | 9/1985 | Krude | |
| 6,010,409 A | 1/2000 | Johnson | |
| 6,482,094 B2 | 11/2002 | Kefes | |
| 6,530,843 B2 | 3/2003 | Miller et al. | |
| 6,540,616 B2 * | 4/2003 | Miller | F16D 3/223 |
| | | | 137/849 |
| 6,780,114 B2 | 8/2004 | Sahashi et al. | |
| 6,793,581 B2 | 9/2004 | Meyer et al. | |
| 6,793,584 B2 * | 9/2004 | Ramey | F16D 3/845 |
| | | | 464/175 |
| 6,926,612 B2 | 8/2005 | Wang et al. | |
| 7,097,563 B2 | 8/2006 | Benson et al. | |
| 7,104,893 B2 | 9/2006 | Ouchi et al. | |
| 7,204,760 B2 | 4/2007 | Wang | |
| 7,238,114 B2 | 7/2007 | Wang et al. | |
| 7,575,519 B2 | 8/2009 | Dice et al. | |
| 8,025,579 B2 | 9/2011 | Kamikawa et al. | |
| 8,070,613 B2 * | 12/2011 | Cermak | F16D 3/2237 |
| | | | 464/145 |
| 8,262,489 B2 | 9/2012 | Valovick | |
| 8,287,393 B2 * | 10/2012 | Dao | F16D 3/226 |
| | | | 464/173 |
| 8,353,775 B2 | 1/2013 | Kamikawa et al. | |
| 8,475,286 B2 * | 7/2013 | LaMothe | F16D 3/2055 |
| | | | 464/111 |
| 8,834,279 B2 * | 9/2014 | Oh | F16D 3/843 |
| | | | 464/15 |
| 2001/0016520 A1 * | 8/2001 | Sahashi | B60B 27/00 |
| | | | 464/182 |
| 2003/0146591 A1 | 8/2003 | Ouchi et al. | |
| 2007/0149298 A1 * | 6/2007 | Wormsbaecher | F16D 3/845 |
| | | | 464/145 |
| 2010/0267455 A1 * | 10/2010 | Valovick | F16D 1/0858 |
| | | | 464/142 |
| 2012/0004044 A1 * | 1/2012 | Conger | F16D 1/116 |
| | | | 464/141 |
| 2013/0244798 A1 * | 9/2013 | Oh | F16D 3/843 |
| | | | 464/17 |

* cited by examiner

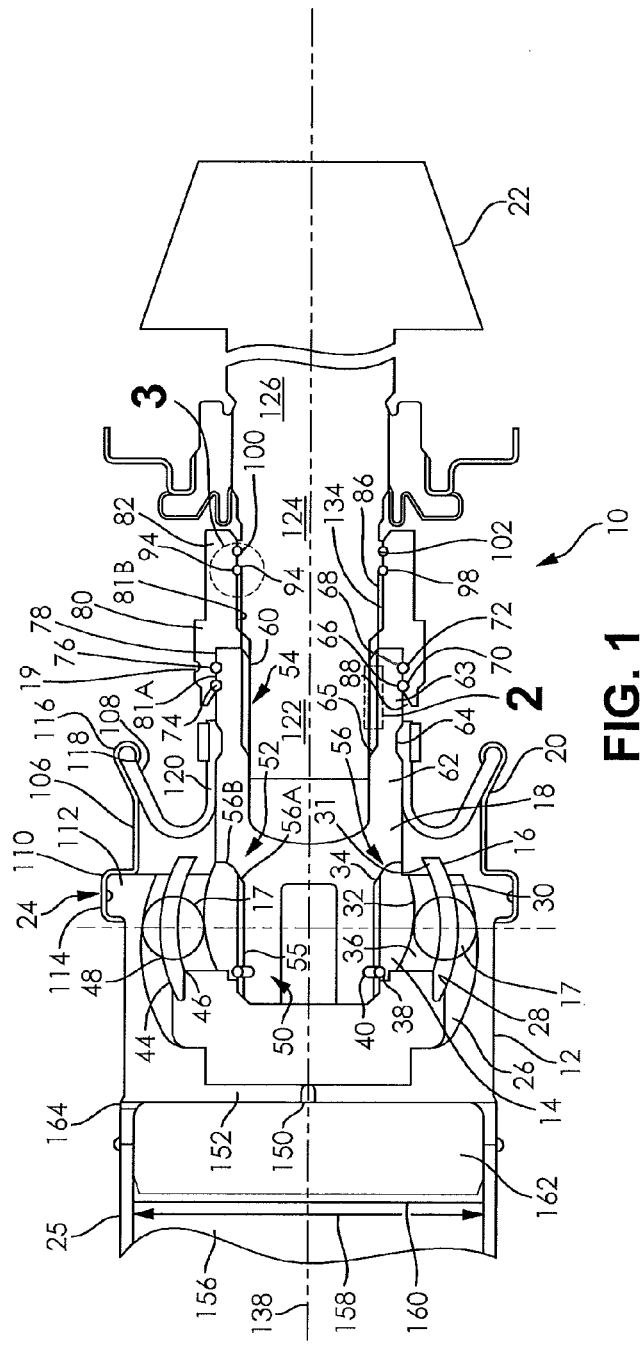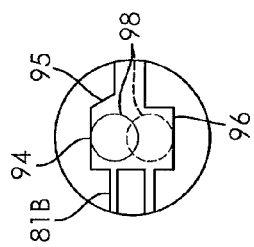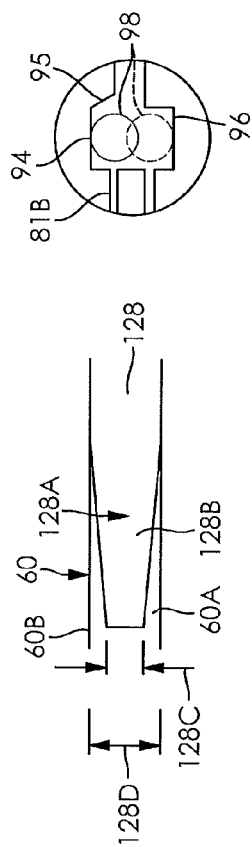
FIG. 1
FIG. 3
FIG. 2

CONSTANT VELOCITY JOINT

RELATED APPLICATIONS

This application claims priority to and the benefit of U.S. Patent Application Ser. No. 61/916,902 filed on Dec. 17, 2013, which is incorporated by reference herein.

BACKGROUND

Constant velocity joints are well known devices that allow a drive shaft to transmit power through a variable angle, at constant rotational speed, without an appreciable increase in friction or play. The joints typically comprise an inner race, an outer race, a cage and a plurality of balls. The balls are located in apertures in the cage. The balls roll along surfaces of the inner race and outer race when the joint is at an angle. The balls transmit torque through the joint regardless of the joint angle.

A pinion shaft is typically connected to the inner race in some fashion. Rotation is provided to the joint through the pinion shaft. In some cases, the pinion shaft is mounted directly into the inner race. This arrangement can be difficult to service. It would be preferable to have an easily serviceable joint.

SUMMARY

A constant velocity joint has an inner race with a first end portion of a sleeve connected to the inner race. A second end portion of the sleeve is hollow and receives a pinion shaft. The pinion shaft has a set of threads on an outer surface. A nut is provided with a set of threads on an inner surface. The nut threads engage with the pinion threads. Additionally, the nut is connected to the second end portion of the sleeve with a snap ring.

BRIEF DESCRIPTION OF THE DRAWINGS

FIG. 1 is a cross-sectional view of one embodiment of constant velocity joint;
FIG. 2 is a partial view of a detail of a feature in FIG. 1;
FIG. 3 is a partial view of a detail of a feature in FIG. 1.

DETAILED DESCRIPTION OF THE PREFERRED EMBODIMENTS

Figure 4:
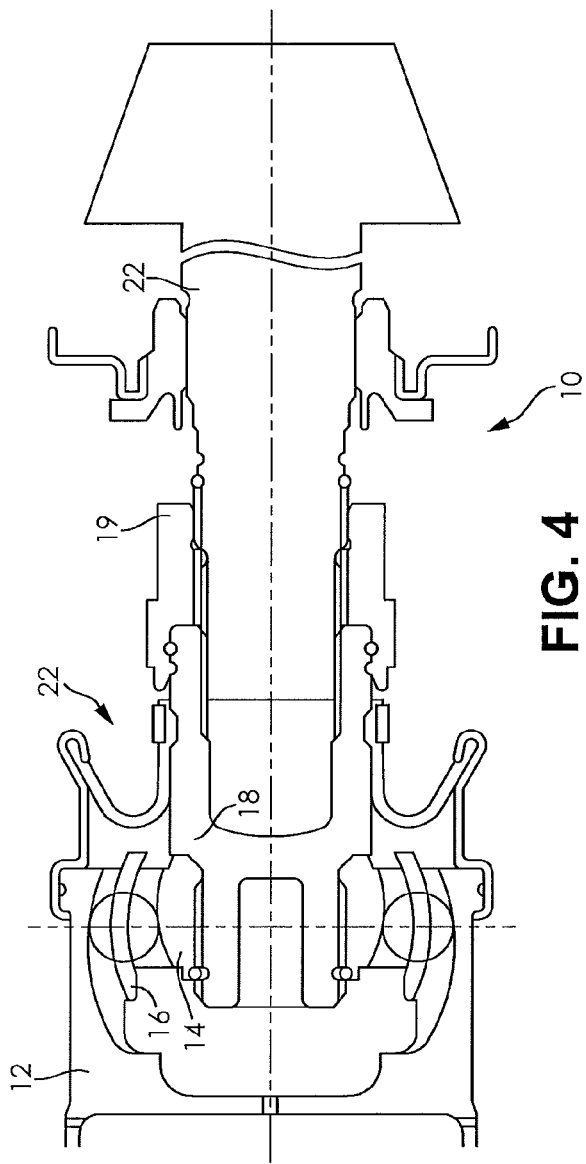
FIG. 4 is a cross-sectional view the constant velocity joint of FIG. 1 in an assembly step.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

FIGS. 1-2 illustrate a constant velocity joint 10 according to an embodiment of the invention. The constant velocity joint 10 includes an outer race 12, an inner race 14, a cage 16, a plurality of torque transferring elements 17, a drive sleeve 18, a drive nut 19, and a boot assembly 20. A plug-in pinion shaft 22 is drivingly engaged with the drive sleeve 18, and the drive sleeve 18 is drivingly engaged with the inner race 14. The constant velocity joint 10 is a Rzeppa style constant velocity joint; however, it is understood that the constant velocity joint 10 may be any other type of constant velocity joint.

The outer race 12 is a hollow cylindrical body formed from a rigid material such as a steel. The outer race 12 is typically forged and then machined in a secondary operation. However, it is understood the outer race 12 may be formed using other processes from any rigid material. An attachment end 24 is formed in the outer race 12, and is drivingly engaged with a shaft 25. Alternately, it is understood that the attachment end 24 may be coupled to any other type of member.

A plurality of outer tracks 26 are formed in an inner surface 28 of the outer race 12. Each of the outer tracks 26 has an arcuate profile which follows an arcuate path, the arcuate path having a center point different from a center point of the constant velocity joint 10. The outer race 12 includes eight outer tracks 26 formed therein. However, it is understood that each of the outer tracks 26 may have a non-arcuate profile and any number of the outer tracks 26 may be formed in the outer race 12. The plurality of outer tracks 26 is equally spaced about the axis of the outer race 12.

The inner surface 28 is a spherical surface of the outer race 12 having a center point common with the center point of the constant velocity joint 10. A radius of the inner surface 28 is complementary to an outer surface 30 of the cage 16. The plurality of outer tracks 26 and the inner surface 28 are precision machined for use as surfaces of a constant velocity joint as is known in the art.

The inner race 14 is a hollow member formed from a rigid material such as a steel. It is understood that the inner race 14 may be formed using any conventional process from any rigid material. When the drive sleeve 18 is drivingly engaged with the inner race 14, the inner race 14 is typically spliningly disposed on an end portion of the drive sleeve 18.

The inner race 14 includes an inner race outer surface 31 and an inner race inner surface 32. The inner race outer surface 31 is a spherical surface of the inner race 14 having a center point common with the center point of the constant velocity joint 10. The inner race inner surface 32 defines a cylindrical bore through the inner race 14. A plurality of splines 34 is formed on the inner race inner surface 32 for drivingly engaging the inner race 14 with the drive sleeve 18.

A plurality of inner tracks 36 are formed in the inner race outer surface 30. Each of the inner tracks 36 has an arcuate profile which follows an arcuate path, the arcuate path having a center point different from a center point of the constant velocity joint 10. The diameter of the arcuate profile of each of the inner tracks 36 is complementary to the diameter of the arcuate profile of each of the outer tracks 26 corresponding thereto. As shown in FIGS. 1-2, a depth of each of the inner tracks 36 varies depending on a distance the inner race outer surface 31 is from the axis of the inner race 14. The inner race 14 includes eight inner tracks 36 formed therein. However, it is understood that each of the inner tracks 36 may have a non-arcuate profile and any number of the inner tracks 36 may be formed in the inner race 14. The plurality of inner tracks 36 is equally spaced about the axis of the inner race 14.

The inner race 14 is secured to the drive sleeve 18 using a snap ring 38 disposed in a groove 40 formed in an outer surface of the drive sleeve 18. Alternately, any other type of fastener may be used to secure the inner race 14 to the drive sleeve 18.

The cage 16 is disposed between the outer race 12 and the inner race 14. The cage 16 is a hollow body machined from a rigid material such as steel. However, it is understood the cage 16 may be formed using other processes from any rigid material. The cage 16 includes a spherical outer surface 44 and a spherical inner surface 46. A plurality of perforations 48 is formed through the cage 16.

The spherical outer surface 44 has a center point common with the center point of the constant velocity joint 10. The spherical outer surface 44 defines a portion of each of the perforations 48. The spherical outer surface 44 is disposed against and slidingly engages the inner surface 28 of the outer race 12. A diameter of the spherical outer surface 44 is complementary to the inner surface 28 of the outer race 12. The spherical outer surface 44 and the inner surface 28 are precision machined for use as mating surfaces of a constant velocity joint as is known in the art.

The spherical inner surface 46 has a center point common with the center point of the constant velocity joint 10. The spherical inner surface 46 defines a portion of each of the perforations 48. The spherical inner surface 46 is disposed against and slidingly engages the inner race outer surface 30. A radius of the spherical inner surface 46 is complementary to a radius of the inner race outer surface 30. The spherical inner surface 46 and the inner race outer surface 31 are precision machined for use as mating surfaces of a constant velocity joint as is known in the art.

The plurality of torque transferring elements 17 comprises steel spheres disposed in each of the perforations 48, the outer tracks 26, and the inner tracks 36. Each of the torque transferring elements 17 is a ball bearing as is known in the art. However, it is understood that the plurality of torque transferring elements 17 may be any other shape and formed from any other rigid material. A diameter of each of the torque transferring elements 17 is complementary to the diameter of the arcuate profiles of each of the outer tracks 26 and the inner tracks 36. The torque transferring elements 17, the outer tracks 26, and the inner tracks 36 are precision machined for use as mating surfaces of a constant velocity joint as is known in the art. One torque transferring element 17 is disposed and in sliding engagement with each of the outer tracks 26 and each of the inner tracks 36.

The drive sleeve 18 is an annular member formed from a rigid material such as a steel. It is understood that the drive sleeve 18 may be formed using any conventional process from any rigid material. The drive sleeve 18 is disposed against and is in driving engagement with the inner race 14. The drive sleeve 18 comprises a first end portion 50, a middle portion 52, and a second end portion 54. The first end portion 50 is drivingly engaged with the inner race 14, the middle portion 52 is disposed against the inner race 14, and the second end portion 54 is drivingly engaged with the plug-in pinion shaft 22.

The first end portion 50 is a cylindrical shaped portion of the drive sleeve 18 splinigly engaged with the inner race 14. A plurality of splines 55 are formed in an outer surface of the first end portion 50. Alternately, it is understood that the drive sleeve 18 may be unitarily formed with the inner race 14 or coupled thereto in any conventional manner. The groove 40 is formed in the first end portion 50 of the drive sleeve 18.

The middle portion 52 is a substantially disk shaped portion of the drive sleeve 18 located between the first end portion 50 and the second end portion 54. The middle portion 52 has an outer diameter greater than an outer diameter of the first end portion 50. The middle portion 52 defines a sleeve seat 56 of the drive sleeve 18. The sleeve seat 56 in the depicted embodiment has an angled portion 56A connected to a radial portion 56B that extends vertically. When the first end portion 50 is drivingly engaged with the inner race 14, the sleeve seat 56 is disposed against a portion of the inner race 14 with a complementary shape.

The second end portion 54 is hollow and it is formed opposite the first end portion 50. The second end portion 54 comprises a first inner diameter portion 62 and a second inner diameter portion 63. The first inner diameter portion 62 has a smaller diameter than the second inner diameter portion 63. A ramped transition 65 connects the two diameter portions 62, 63.

The second end portion 54 comprises a plurality of inner splines 60 in the second inner diameter portion 63, a boot groove 64, a first O-ring groove 66 and a first snap ring groove 68. A first O-ring 70 is located in the first O-ring groove 66 and a first snap ring 72 is located in the first snap ring groove 68. The grooves 66, 68 and rings 70, 72 are located on an outer surface 78 of the second end portion 54. The second end portion 54 is sealingly engaged with a portion of the boot assembly 20.

The plurality of inner splines 60 is formed on the second diameter portion 63 of the second end portion 54 for drivingly engaging the plug-in pinion shaft 22. The splines 60 are characterized by male valleys 60A alternating with female lands 60B. Alternately, it is understood that the second end portion 54 may be coupled to the plug-in pinion shaft 22 in any manner that permits sliding engagement.

The snap ring 72 engages a snap ring groove 76 on a first inside surface 74 of the drive nut 19. The snap ring 72 axially secures the drive nut 19 and the drive sleeve 18. Alternately, it is understood that the second end portion 54 may be configured to be engaged with the drive nut 19 in any conventional manner. The O-ring 70 tightly seals the interface between the drive nut 19 and the drive sleeve 18.

The boot groove 64 is an annular recess defined by the outer surface 74 of the second end portion 54. The boot groove 64 is formed intermediate the grooves 66, 68 and the middle portion 52. The boot groove 64 receives a portion of, and is sealingly engaged with, the boot assembly 20. Alternately, it is understood that the second end portion 54 may be configured with another feature which receives and sealingly engages the boot assembly 20.

The drive nut 19 is a hollow annular member formed from a rigid material such as a steel. It is understood that the drive nut 19 may be formed using any conventional process from any rigid material.

The drive nut 19 comprises a first portion 80 and a second portion 82. The portions 80, 82 are unitary and integrally formed. The first portion 80 radially overlaps a part of the drive sleeve second end 54. The first portion 80 has the snap ring groove 76. The first portion 80 has a larger inner diameter portion 81A than an inner diameter portion 81B of the second portion 82.

The first portion 80 has a first chamfered surface 88 proximate the snap ring groove 84 to facilitate compression of the snap ring 72 during assembly.

The inner diameter 81B of the second portion 82 has a plurality of threads 86 thereon. The drive nut threads 86 engage with a complementary set of threads on the shaft 22. The inner diameter 81B also defines a second snap ring groove 94. The shaft 22 has a complementary snap ring groove 96. A snap ring 98 is located in grooves 94, 96 to axially secure the nut 19 and shaft 22 together. The shaft 22 also has an O-ring groove 100 in which an O-ring 102 is located. The O-ring 102 seals the interface between the shaft 26 and the nut 19.

As can be appreciated from FIG. 3, the snap ring groove 94 has a chamfered edge 95 to facilitate remove of the nut 19, such as for repair or replacement.

The boot assembly 20 comprises a boot retainer 106 and a boot 108. As shown in FIGS. 1 and 2, the boot assembly 20 is disposed on the outer race 12 and is in sealing engagement with the drive sleeve 18. The boot 108 is coupled to the boot retainer 106 by a crimped portion of the boot retainer 106. The boot 108 is sealingly engaged with the drive sleeve 18 using a clamping device (not shown). The clamping device is a band style clamp; however, it is understood that other types of clamping devices may be used.

The boot retainer 106 is an annular member formed from a rigid material, such as a metal or a plastic. The boot retainer 106 is coupled to and is sealingly engaged with the outer race 12. A first end portion 110 of the boot retainer 106 engages a shoulder 112 defined by an outer surface 114 of the outer race 12; however, it is understood that the boot retainer 106 may be coupled to the outer race 12 in any manner. A second end portion 116 has a substantially U-shaped cross-section which encloses a portion of the boot 108 to couple the boot 108 to the boot retainer 106. Alternately, the second end portion 116 may have other shapes that facilitate coupling the boot 108 to the boot retainer 106.

The boot 108 is an annular member having a substantially U-shaped cross-section formed from a resilient material, such as an elastomer. The boot 108 facilitates movement between the outer race 12 and the drive sleeve 18 while sealing engagement is maintained therebetween. A first end portion 118 of the boot 108 is coupled to the boot retainer 106 as described hereinabove. A second end portion 120 of the boot 108 is sealingly engaged with and coupled to the boot groove 64 of the drive sleeve 18 as described hereinabove.

The plug-in pinion shaft 22 is an elongate member which is drivingly engaged with the drive sleeve 18 when the constant velocity joint 10 is assembled. The plug-in pinion shaft 22 is formed from a rigid material such as steel using any conventional process. The plug-in pinion shaft 22 comprises a first end portion 122, a middle portion 124, and a second end portion 126.

The first end portion 122 of the plug-in pinion shaft 22 is a cylindrical shaped portion formed opposite the second end portion 126. The first end portion 122 is initially located within the sleeve to pilot the shaft 22 within the sleeve 18. The first end portion 122 comprises a plurality of outer splines 128 corresponding to the inner splines 60 of the drive sleeve 18. When the constant velocity joint 10 is assembled, the plug-in pinion shaft 22 is drivingly engaged with the drive sleeve 18 through the splines 128, 60 so that the two rotate together as one. The plurality of outer splines 128 is formed on an outer surface 130 of the plug-in pinion shaft 22. Alternately, it is understood that the plug-in pinion shaft 22 may be drivingly engaged with the plug-in pinion shaft 22 in any manner that permits sliding engagement.

As best seen in FIG. 2, the outer splines 128 are preferably comprised of a portion 128A wherein the male splines 128B taper from a first thickness 128C to a second thickness 128D, wherein the first thickness is less than the second thickness. The portion 128A may comprise the length of the male splines 128B.

The portion 128A is located radially inward from the second end portion 54 of the sleeve 18 when the shaft is installed on the sleeve 18. Also when the shaft 22 is installed into the sleeve 18, the portion 128A of the splines 128 engages with splines 60 on the sleeve 18. The portion 128A facilitates the initial engagement of the splines 128 and the splines 60.

Figure 5:
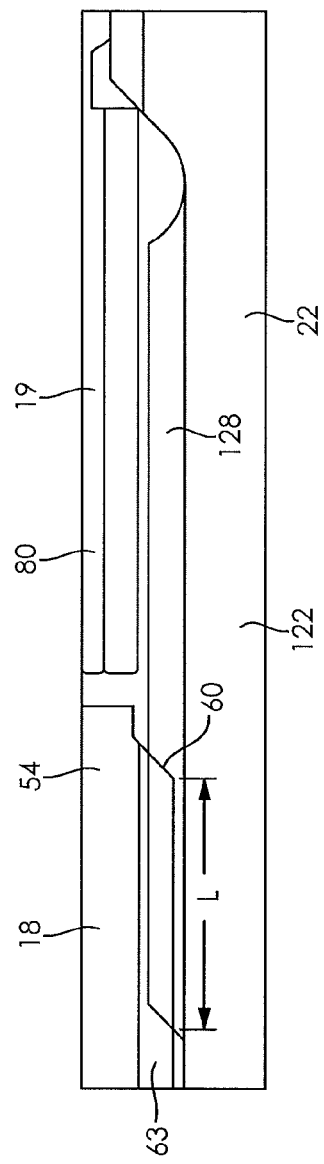
FIG. 5 is a partial view of a detail of a feature in FIG. 4.

Splines 60 and 128 can be engaged by hand. FIGS. 4 and 5 depict the splines 60, 128 about to be engaged with one another. There is a length L that represents the length along the splines 60 that the splines 60, 128 are engaged by hand.

As the shaft 22 is further inserted into the sleeve 18, and the portion 128A is engaged with the splines 60, a set of threads 134 on the shaft 22 begin to engage with the drive nut threads 86, which can be seen in FIG. 5. Engagement of the threads 86, 134 axially secured the nut 19 and the shaft 22. The threads 86, 134 may be manually engaged or they may be engaged by automated means. In either case, rotation of the shaft 22 facilitates engagement. An adhesive may be applied to the threads 86, 134 to assist in fixing the nut 19 relative to the shaft 22.

A first vent hole 150 is provided in the outer race 12. More particularly, a first vent hole 150 is located along the longitudinal axis 138 of the outer race 12. The first vent hole 150 is positioned in a disk shaped portion 152 of the outer race 12 that connects the circumferential outer tracks 26 and the circumferential attachment end 24.

A single first vent hole 150 aligned with the longitudinal axis 138 is shown, however, additional vent holes in the disk shaped portion 152 are permissible.

The attachment end 24 of the outer race 12 is drivingly engaged with shaft 25. The engagement is typically via welding, but other attachment methods may also be used.

The shaft 25 has a hollow interior 156 defined by a substantially constant inner diameter 158 of the shaft 25. A plug 160 may be located in the hollow interior 156 where the plug 160 extends continuously across the inner diameter 158. The plug 160 is solid without any gaps or breaks and it seals in an airtight manner against the inner diameter 158.

The shaft 25, the plug 160, and outer race 12 create an interior void area 162. The interior void area 162 is in fluid communication with a second vent hole 164.

The second vent hole 164 is provided in the attachment end 24 of the outer race 12. While one second vent hole 164 is depicted in the FIG. 2 additional vent holes may be used. The additional vent holes may be circumferentially spaced about the attachment end 24, or any spacing may be arranged between them. The second vent hole 164 permits air to leave an interior 166 of the joint 10. Thus, air communicates from the interior 166 of the joint 10, through the first vent hole 150, through the interior void portion 156, and through the second vent hole 164, where it may be exhausted to the atmosphere.

The second vent hole 164 may be fitted with a check valve or other covering (neither being shown in the figure) in order to prevent dirt, debris or moisture from entering the joint 10 and/or clogging the vent holes 164, 150.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:
1. A constant velocity joint, comprising:
 an inner race;
 a sleeve having a first end portion, a middle portion and a second end portion,
  wherein said first end portion is connected to an inner surface of said inner race via mating splines;

wherein said second end portion is hollow and has a plurality of splines on an inside surface;

a pinion shaft having a first end portion, a middle portion and a second end portion;

wherein an outer surface of said pinion shaft first end portion has a plurality of splines engaged with the sleeve second end portion splines;

wherein an outer surface of said pinion shaft middle portion has a set of threads;

a nut having a first portion and a second portion wherein an inner surface of said second portion has a set of threads engaged with said set of threads on said outer surface of said pinion shaft middle portion, wherein said nut first portion is connected to said second end portion of said sleeve with a snap ring.

2. The constant velocity joint of claim 1, wherein said inner surface of said inner race has a first set of splines and an outer surface of said first end portion of said sleeve has a second set of splines complementary to said first set of splines.

3. The constant velocity joint of claim 1, wherein a snap ring groove is located within said sleeve first end portion splines and a snap ring groove is located within said inner race splines and a snap ring is located within said grooves.

4. The constant velocity joint of claim 1, wherein the sleeve middle portion defines a sleeve seat disposed against the inner race.

5. The constant velocity joint of claim 1, wherein an outer surface of said sleeve second end portion has a boot groove and a snap ring groove.

6. The constant velocity joint of claim 1, wherein said nut first portion has a snap ring groove on an inner surface and said snap ring is located within said nut first portion snap ring groove and a snap ring groove located within said sleeve second end portion.

7. The constant velocity joint of claim 1, wherein said nut second portion has a snap ring groove on said inner surface and said pinion shaft middle portion has a snap ring groove and a snap ring is located within said grooves.

8. The constant velocity joint of claim 1, wherein a vent hole is located along a longitudinal axis of said inner race.

9. The constant velocity joint of claim 1, wherein said sleeve middle portion has a larger outer diameter than said sleeve first end portion.

10. The constant velocity joint of claim 1, wherein said sleeve second end portion is hollow and has a first inner diameter portion and a second inner diameter portion, wherein a plurality of splines are formed on said sleeve second inner diameter portion.

11. The constant velocity joint of claim 1, wherein said pinion shaft splines have a tapered end portion.

* * * * *